Patented Apr. 28, 1953

2,636,825

UNITED STATES PATENT OFFICE 2,636,825

REFRACTORY CARBIDE AND NITRIDE PRODUCT AND METHOD OF MAKING

Kenneth C. Nicholson, Niagara Falls, N. Y., assignor to The Carborundum Company, Niagara Falls, N. Y., a corporation of Delaware No Drawing. Application December 30, 1948, Serial No. 68,375

10 Claims. (Cl. 106—44)

This invention relates to bonded silicon carbide material and articles composed thereof, and to methods of making the same.

Silicon carbide is generally reserved for the making of refractories which are to be used under severe operating conditions where the temperature is extremely high, the fluctuations in temperature are abnormally great, the requirements of mechanical strength at elevated temperatures are excessive, and/or the corrosive and erosive conditions of use are severe in one or more respects. The high thermal conductivity of silicon carbide also makes it an ideal material for certain refractory applications as, for example, where rapid heat transfer is desired. The superiority of bonded silicon carbide refractories over the more inexpensive fire clay products has justified the added cost of using silicon carbide products in many cases. Considerable attention has been paid therefore to ways of taking the best possible advantage of the extremely refractory properties and qualities of the silicon carbide particles by the use therewith of bonding materials which are themselves of sufficient refractoriness that they do not materially detract from the satisfactoriness of the silicon carbide material. Ingredients for the bonding of silicon carbide particles in the manufacture of silicon carbide shapes which would possess the necessary refractory characteristics and would fuse at elevated temperatures and thereby bond the silicon carbide particles together have therefore been sought. In spite of the extensive activity in this direction the full benefits to be derived from the highly refractory, resistant character of the silicon carbide itself have never been realized.

Heretofore efforts to produce a bond for silicon carbide particles which would have an extremely high strength at elevated temperatures and would be resistant to substantial fluctuations in temperature and at the same time would be satisfactorily resistant to oxidation have been only partially successful. Clay and other ingredients producing bonds of the porcelain type have resulted in bodies which have had good hot strength, but which are not sufficiently oxidation-resistant to give a satisfactory life. Other silicon carbide bodies using bonds of a glassy nature have been fairly resistant to oxidation, only to fail at operating temperatures because of softening of the glass bonds and loss of strength. Attempts to improve the properties of such articles by the application of various glazes to the formed article or by the incorporation of glass-developing materials within the body of the article as a component of the bonding material have not been entirely successful, sometimes because of the temporary character of the glaze and in other instances because of the tendency of the glaze to cause staining or discoloration of articles coming in contact with the refractory during use at high temperatures. Such disadvantages have greatly limited the range or field of use in which silicon carbide refractories have been capable of application.

A high resistance to spalling as well as a fairly high strength at elevated temperatures has led also to the use of coke residue bonds in spite of the fact that such bonds are even more susceptible to rapid oxidation and destruction than is silicon carbide. Likewise attempts to bond silicon carbide through the use therewith of other refractory carbide materials which fuse at low temperatures to provide the desired bonding action have not been entirely satisfactory because of the shrinkage of the bonding carbide during fusion resulting in a porosity in the bonded article which promotes more rapid attack by corrosive and erosive elements during use. Regardless of the type of bond heretofore used each one has had some specific disadvantage to limit its field of application or appreciably shorten its useful life.

It is an object of the present invention to provide an improved bonded silicon carbide material or body which is resistant to high temperatures.

It is a further object to provide a bonded silicon carbide body which is highly resistant to heat shock or rapid fluctuations in temperature.

It is a still further object to provide a bonded silicon carbide article in which the bond as well as the silicon carbide component is of a refractoriness considerable above that of such bonding materials as glass, porcelain and the like.

It is a still further object to provide a bonded silicon carbide article, which, in addition to possessing the aforesaid properties, will be sufficiently resistant to oxidation to permit its continued use at temperatures as high as 1450° C. and even higher.

Another object is to provide a chemically resistant bonded silicon carbide article.

Other objects and advantages accruing from the present invention will become obvious as the description proceeds.

I have found that a mixture of silicon carbide and boron carbide when heated to the proper temperature in a furnace in which a non-oxidizing nitrogenous atmosphere is maintained will form a product which, according to the most reliable methods of analysis available, is essentially silicon carbide bonded by an interstitial matrix containing boron nitride and boron carbide. The matrix may also contain some silicon carbide in solid solution.

In accordance with the present invention, bonded silicon carbide articles or bodies are made by preparing a mixture of silicon carbide and boron carbide together with a small amount of temporary binder, and forming the desired shape or body by suitable molding procedures such as placing the mixture in a steel mold and pressing at high pressures. The amount by weight of silicon carbide is usually in excess, and preferably, substantially in excess, of the amount by weight of boron carbide. The molded article is then dried at a low temperature to remove as much as possible of the volatile constituents of the temporary binder and the article is then heated to the proper temperature in a furnace in which a non-oxidizing nitrogenous atmosphere is maintained. The resulting article, without appreciable change in size or shape, becomes bonded together during the firing, presumably by the formation of boron nitride, although the exact mechanism of the bonding together of the particles is not fully known. There may be also a melting together or sintering of a portion of the original constituents present, or a part of the silicon carbide may form a solid solution with the boron carbide.

In order that the invention may be more fully understood the following specific examples are submitted for illustrative purposes and indicate the manner in which silicon carbide articles bonded by boron nitride can be formed in accordance with the practices and principles of the present invention.

*Example I*

Nozzles for use in rockets have been made by the following procedure. The nozzle is formed by pressing the following mixture in a steel mold at 50,000 pounds per square inch pressure in a hydraulic press.

| | Parts by weight |
|---|---|
| 30 grit size silicon carbide grain | 33 |
| 46 grit size silicon carbide grain | 33 |
| 180 grit size silicon carbide grain | 4 |
| 320 grit size boron carbide ($B_4C$) | 30 |

6% by weight of a temporary binder such as polyvinyl alcohol and water, for example, is added to the above mixture and the material well mixed to form a pressure-moldable mass. Although a water solution of polyvinyl alcohol is specified as the temporary binder in the above mixture any of those materials commonly used for temporary binders in ceramic mixes can be used such as dextrin, concentrated waste cellulose sulfite liquors and powders, various resins and the like can be used.

The molded nozzle is dried at 225–250° F. and then placed in a graphite lined chamber of a high frequency electric furnace with the nozzle standing on a pedestal of graphite. An inlet tube made of graphite is used to pass nitrogen gas into the furnace chamber. A graphite plate, used to cover the top of the furnace, is provided with a hole in the center which serves as a vent for the gases created during the burning operation and also permits temperature readings to be taken of the furnace interior by means of an optical pyrometer. The furnace is heated to an approximate temperature of 700° C. and held at that temperature until the temporary binder is burned off. A nitrogenous atmosphere is provided in the furnace chamber by introducing a stream of commercial grade dry nitrogen gas from a tank under pressure through the graphite inlet tube. Having established an atmosphere of nitrogen within the furnace the furnace is rapidly heated until a temperature of 2250°–2275° C. is reached. The temperature is then held at 2250–2275° C. for 30 minutes after which the electric power is shut off and the furnace allowed to cool while maintaining a flow of nitrogen into the furnace.

Although the temperature is stated above to be 2250–2275° C., as determined by a conventional optical pyrometer, the temperature may vary somewhat from that figure due to the difficulty in obtaining exact temperature readings under the conditions of operation. The fumes issuing from the furnace chamber and the colored flames which are visible in the sighting hole for the optical pyrometer make it extremely difficult to obtain exact temperatures. However, the correct temperature to fire the article can be said to be the temperature at which the article retains a smooth, dense surface and a gain in weight on the order of around 10%, based on the original weight of the molded article minus the weight of the temporary binder, is obtained.

Upon removal of the nozzle from the furnace the surface may be covered with loosely adhering beads of molten material which can be readily wiped off, leaving the surface smooth and dark gray to black in color. No appreciable change in size occurs during the firing operation. A pronounced gain in weight is observed which is estimated to be due to the formation of boron nitride as determined by the various methods of analysis available for such materials.

A chemical analysis of a nozzle made in accordance with Example I above shows the following composition for the fired nozzle:

| | Percent |
|---|---|
| Silicon | 44.96 |
| Carbon | 26.33 |
| Boron | 18.66 |
| Nitrogen | 9.94 |
| | 99.89 |

Assuming that all the silicon is combined with carbon as silicon carbide and that all the nitrogen is present as boron nitride, BN, the following is the calculated composition of the fired nozzle:

| | Percent |
|---|---|
| Silicon carbide, SiC | 64.2 |
| Boron nitride, BN | 17.6 |
| Boron carbide, $B_4C$ | 14.03 |
| Uncombined carbon | 4.04 |
| | 99.87 |

It is known that silicon nitride decomposes at around 1900° C. and, since the nozzle was heated to 2250–2275° C. it appears likely that the nitrogen which is taken up enters the composition by reason of reaction with a portion of the boron carbide, the nitrogen replacing carbon under these conditions to form boron nitride.

Cylindrical rocket nozzles approximately 3½″ high and approximately 3¼″ outside diameter with a restricted throat have been made by the following procedure. The nozzle is formed by placing the following mixture in a steel mold and pressing at 12,000 pounds per square inch pressure in a hydraulic press.

| | Parts by weight |
|---|---|
| 14–36 grit size silicon carbide grain | 50 |
| 40–60 grit size silicon carbide grain | 15 |
| 60 and finer grit size silicon carbide grain | 10 |
| 320 grit size boron carbide ($B_4C$) | 25 |
| Pine oil | 3 |
| "Vinsol"/"Bakelite" #127 resin (5:4 ratio) | 3 |

"Vinsol" is the trade-mark name for a powdered thermoplastic resinous derivative of rosin sold by Hercules Powder Company, Wilmington, Delaware. It is derived from the solvent extraction of rosin from pine stumps, and consists chiefly of highly oxidized abietic and polymerized abietic acids with smaller amounts of polyphenols, ligneous materials, terpenes and unoxidized abietic acid. "Bakelite" #127 is a powdered A-stage phenol-formaldehyde resin sold under that trade-mark name by the Bakelite Corporation of Bloomfield, New Jersey.

The nozzle, after pressing, is removed from the mold and processed in the same manner as that set forth for Example 1 above.

If the temperature is allowed to go too high the molded articles begin to fuse, large pores develop and a loss in weight occurs. Furthermore, the dissociation of silicon carbide takes place at a temperature not too greatly above the temperature range required in forming articles of the herein-described type. It is therefore necessary in firing articles in accordance with the present invention that the temperature be maintained carefully within a range in which the desired gain in weight in the article is secured and a dense structure obtained without bringing about excessive or complete fusion of the material or the development of a porous structure, or the dissociation of the silicon carbide.

While I have described in the above examples the making of various molded shapes in which the article is molded and nitrided in the exact shape and form in which it is intended for use, the present invention is not to be so restricted. Another way of making and using boron nitride-bonded silicon carbide bodies of the present invention is to mold the raw batch of material into briquettes or other shapes or otherwise compress a mass of the material having a composition the same as or similar to those given earlier herein for making the articles of the specified examples, after which the resulting compressed bodies are nitrided in the manner already described. After removal from the furnace, they are crushed to granular form of the desired grit sizes. The resulting granular material can then be used in loose granular form as a high temperature material; for example, around jet engines and rocket combustion chambers, or as a refractory lining or bedding material in industrial furnaces. It may also be used as a loose filtering media or as a catalyst or catalyst carrier material. The granular material also can be bonded by means of sintered metals, vitreous or ceramic bonds or other bonding materials to form articles suitable for many of the industrial uses set forth elsewhere herein.

Although commercial grade, dry nitrogen gas, which has a purity of 99.7%, has been mentioned for use in the examples set forth above, similar results can be obtained by the use of other non-oxidizing atmospheres containing nitrogen. For example, commercial annealing hydrogen, which has an approximate analysis of 93% nitrogen and 7% hydrogen, or ammonia gas, can be similarly used in place of nitrogen.

The ratio of boron nitride bond to silicon carbide provided in the bonded silicon carbide articles made in accordance with the present invention is not critical and may vary considerably depending upon the type of article being fabricated and the particular combination of properties desired therein, and depending upon the specific use to which the article being formed is to be put. Refractory articles which are extremely satisfactory are obtained from mixtures of silicon carbide and boron carbide in which there are approximately two parts by weight of silicon carbide to approximately one part by weight of boron carbide in the raw batch from which the articles are made. However, the proportion of boron carbide to silicon carbide may be such that the boron nitride bond may amount to as little as 5% of the finished article without departing from the spirit of the invention.

Articles or bodies can be made in accordance with the present invention in which pore-forming materials are incorporated in the raw batch from which the body is made for the purpose of providing a greater degree of porosity in the final body. A pore-forming material, such as carbon or the like, which requires oxidation for removal from a body, would require a preliminary burning out of the pore-forming material at lower temperatures. Therefore, the pore-forming material preferably should be a material which is removed by volatilization during the drying and/or firing operation such as powdered or granular naphthalene, various organic resinous materials such as phenolic resins and the like, or one which provides pores by reason of the generation of a gas. The resulting bodies, which have greater porosity than those made with no pore formers, are particularly useful in the fabrication of porous diffusion and filtering media, catalysts and catalyst carriers, insulation bodies and the like, whether in crushed granular form or in the form of molded shapes of predetermined contour.

Articles made in accordance with the present invention may be molded by any of the well-known methods including pressure molding, machine tamping, hand tamping, jolting, vibrational tamping, air hammer flat or edge tamping, or slip casting.

It is to be understood that the products of the present invention in its various modifications are not limited to any specific field or fields of use such as might be defined by the specific examples previously set forth. The products can be made in any desired shape as well as provided in granular or aggregate form. They are, therefore, not only suited for many of the uses for which industrial refractories are required, including bricks, blocks, setter tile, muffles, kiln furniture, and special shapes for application in and around furnaces and other high temperature equipment, but they are also well suited for many specialty high temperature applications, such as jet engine combustion chambers, linings for exhaust nozzles, rocket combustion chambers and exhaust nozzles, turbine blades, stator blades, lens fusion blocks, and the like. They are also suitable for the fabrication of laboratory ware, including combustion boats, crucibles, burner holders, and other shapes.

The resistance of such bodies to chemical attack makes them highly suitable for the making of articles used in the containing, conveying and handling of many acids, alkalies and other corrosive chemicals, including such articles as chambers and chamber linings, crucibles, pipes and pipe fittings, jet pump linings, and other sundry shapes. The bodies of the present invention, particularly when modified by the use of pore formers in the raw batch from which the bodies are made, are also highly useful as diffusion and filtering media, such as diffusion tubes and plates, filtering tubes, plates and shapes, or as catalysts or catalyst carriers and supports.

Materials and articles of the present invention also can be made for abrasive purposes, such as grinding wheels, sharpening stones, razor hones, and other grinding and polishing shapes and materials. Other miscellaneous uses include their use as thread guides, wire drawing dies, sand blasting nozzles, heating elements, and the like. For example, electrical heating elements in rod form have been made in accordance with the present invention, which have operated at 1400° C. to provide a satisfactory source of radiant heat.

Having thus described the invention it is desired to claim:

1. As a new article of manufacture, a body comprising granular silicon carbide bonded by a matrix of boron carbide and boron nitride.

2. As a new material of manufacture, a body comprising silicon carbide, boron carbide and boron nitride, the silicon carbide constituting the major proportion of said body and the amount of boron nitride being over 5% by weight of said body.

3. An article of manufacture consisting essentially of silicon carbide held together by an interstitial bond of boron carbide and boron nitride.

4. An article of manufacture composed of particles of silicon carbide held together by a bond containing boron nitride and boron carbide.

5. An article of manufacture comprising at least 50% silicon carbide bonded by a matrix material containing boron nitride and boron carbide.

6. A method of making bonded silicon carbide bodies which comprises preparing a mixture of silicon carbide and boron carbide, molding an article therefrom, and firing said article in a non-oxidizing nitrogenous atmosphere.

7. A method of making bonded silicon carbide bodies which comprises preparing a mixture of silicon carbide and boron carbide, molding an article therefrom, and firing said article in an atmosphere of nitrogen.

8. A method of making bonded silicon carbide bodies which comprises preparing a mixture of granular silicon carbide and finely divided boron carbide, molding an article therefrom, and firing said article in a non-oxidizing nitrogenous atmosphere.

9. A method of making bonded silicon carbide bodies which comprises preparing a mixture comprising approximately 2 parts by weight silicon carbide to 1 part by weight of boron carbide, molding an article therefrom, and firing said article in a non-oxidizing nitrogenous atmosphere.

10. A method of making bonded silicon carbide bodies which comprises preparing a mixture comprising approximately 2 parts by weight silicon carbide to 1 part by weight of boron carbide, molding an article therefrom, and firing said article in a non-oxidizing nitrogenous atmosphere between 2100° C. and the dissociation temperature of silicon carbide.

KENNETH C. NICHOLSON.

References Cited in the file of this patent

FOREIGN PATENTS

| Number | Country | Date |
|--------|---------|------|
| 30,869 | Austria | 1907 |
| 478,016 | Great Britain | 1938 |